US009039856B2

(12) United States Patent
Ludes et al.

(10) Patent No.: US 9,039,856 B2
(45) Date of Patent: May 26, 2015

(54) METHOD FOR GLUING A FRICTION LINING, AND TOOL

(71) Applicant: Schaeffler Technologies AG & Co. KG, Herzogenaurach (DE)

(72) Inventors: Jens Ludes, Beckingen (DE); Elmar Stein, Morbach (DE); Ralf Deiters, Reinsfeld (DE); Ralph Kolling, Morbach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 13/721,438

(22) Filed: Dec. 20, 2012

(65) Prior Publication Data

US 2013/0118677 A1    May 16, 2013

Related U.S. Application Data

(63) Continuation of application No. PCT/DE2011/001165, filed on Jun. 3, 2011.

(30) Foreign Application Priority Data

Jun. 24, 2010   (DE) .......................... 10 2010 024 939

(51) Int. Cl.
*B29C 65/64*      (2006.01)
*B29C 43/18*      (2006.01)
*B29C 33/00*      (2006.01)
(Continued)

(52) U.S. Cl.
CPC ............ *B29C 65/64* (2013.01); *B29C 33/0088* (2013.01); *B29C 43/18* (2013.01); *B29C 2043/185* (2013.01); *B29K 2705/00* (2013.01); *B29L 2031/16* (2013.01); *F16D 2069/0466* (2013.01);
(Continued)

(58) Field of Classification Search
CPC ...... B29C 43/027; B29C 43/18; B29C 43/36; B29C 33/0022; B29C 33/0088; B29C 33/301; B29C 33/303; B29C 33/308; B29C 65/64; B29C 2043/185; B29C 2043/189; B29L 2031/7096; B29L 2031/7482; B29L 2031/7486; B29L 2031/16; B29K 2705/00; F16D 69/04; F16D 2069/0425; F16D 2069/0466; F16D 2069/0475; F16D 2069/0483; F16D 2069/0491
USPC .............. 156/228, 288, 516, 580, 581, 583.1, 156/583.2
See application file for complete search history.

(56) References Cited

U.S. PATENT DOCUMENTS 1,396,158 A    11/1921   Bonner
1,945,560 A *   2/1934   Meyercord .................... 156/288
(Continued)

FOREIGN PATENT DOCUMENTS

CN          1093445 A       10/1994
DE        22 30 020 B1     11/1973
(Continued)

*Primary Examiner* — John Goff
*Assistant Examiner* — Hannuri L Kwon
(74) *Attorney, Agent, or Firm* — Lucas & Mercanti, LLP; Klaus P. Stoffel

(57) ABSTRACT

The invention relates to a method for gluing a friction lining to a support by means of adhesive that develops its full adhesive effect under the effect of pressure and/or temperature. The invention is characterized in that the friction lining and the support are pressed together along with the adhesive before the adhesive develops its full adhesive effect in order to glue the friction lining to the support.

4 Claims, 3 Drawing Sheets

(51) Int. Cl.
　　　*B29K 705/00*　　(2006.01)
　　　*B29L 31/16*　　(2006.01)
　　　*F16D 69/04*　　(2006.01)

(52) U.S. Cl.
　　　CPC ........ *F16D 69/04* (2013.01); *F16D 2069/0491* (2013.01)

(56) References Cited

U.S. PATENT DOCUMENTS

| | | | | |
|---|---|---|---|---|
| 3,794,541 | A | * | 2/1974 | Schissler ................ 156/228 |
| 3,895,084 | A | * | 7/1975 | Bauer ................ 156/89.26 |
| 3,967,037 | A | * | 6/1976 | Marzocchi et al. ............ 428/392 |
| 4,045,608 | A | * | 8/1977 | Todd ............................ 428/300.7 |
| 4,749,435 | A | * | 6/1988 | Kogane et al. ............... 156/308.4 |
| 5,957,251 | A | * | 9/1999 | Jones et al. ................ 188/251 R |

FOREIGN PATENT DOCUMENTS

| | | | |
|---|---|---|---|
| DE | 44 31 642 B4 | 5/2007 | |
| EP | 0 443 093 A | 8/1991 | |
| EP | 1473117 A1 * | 11/2004 | ............. B24D 18/00 |
| JP | 61 024843 A | 2/1986 | |
| JP | 2002 098182 A | 4/2002 | |
| WO | 9321459 A1 | 10/1993 | |

* cited by examiner

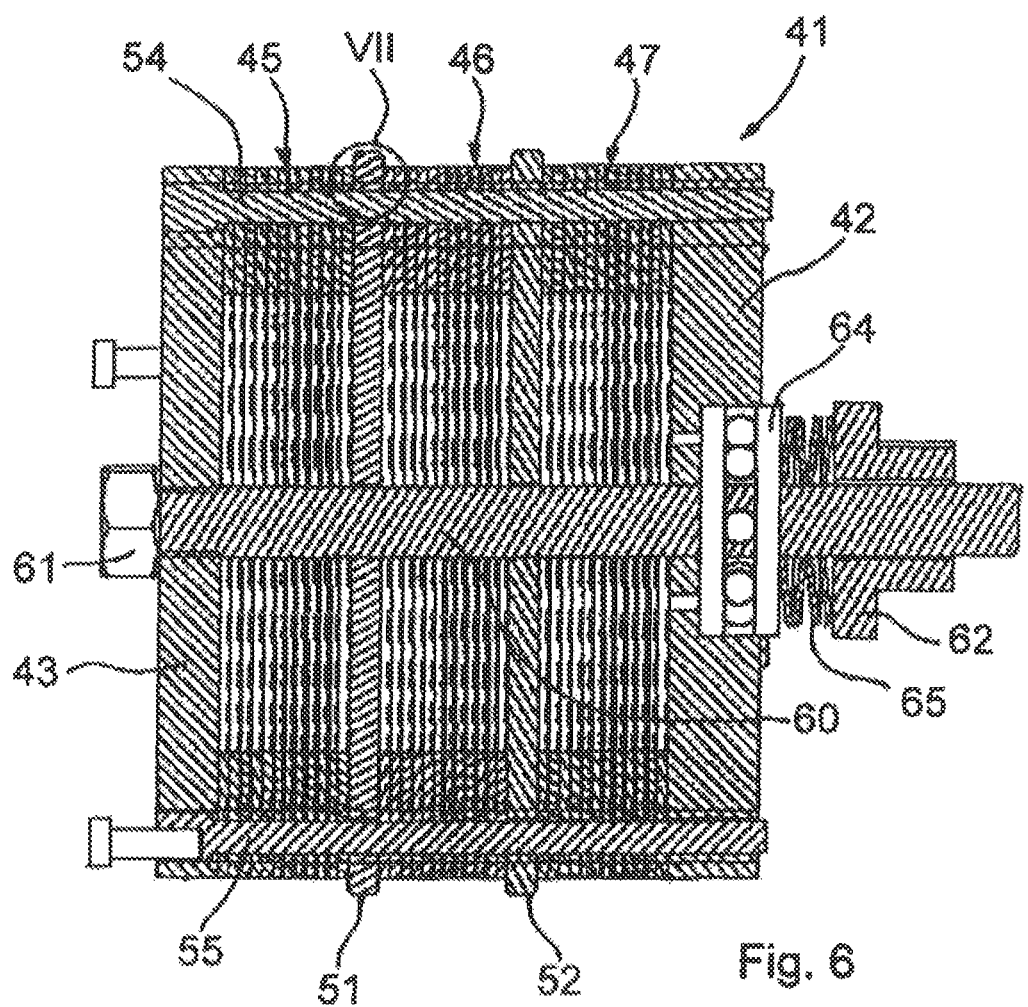
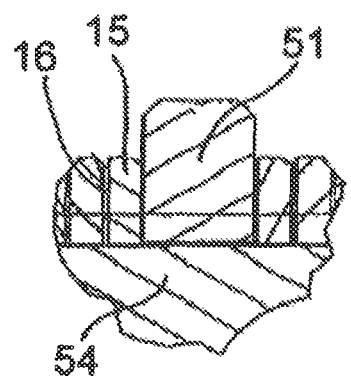

METHOD FOR GLUING A FRICTION LINING, AND TOOL

CROSS-REFERENCE TO RELATED APPLICATIONS

This application is a Continuation of PCT/DE2011/001165 filed Jun. 3, 2011, which in turn claims the priority of DE 10 2010 024 939.4 filed Jun. 24, 2010, the priority of both applications is hereby claimed and both applications are incorporated by reference herein.

BACKGROUND OF THE INVENTION

1. Field of the Invention

The invention relates to a method for gluing a friction lining to a support by means of an adhesive that develops its full adhesive effect under the influence of pressure and/or temperature. The invention further relates to a tool for sticking a friction lining to a support by means of an adhesive. The invention further relates to a tool for stacked gluing of supports comprising friction linings that have been stuck to the supports.

2. Description of Prior Art

It is known from German patent specification DE 44 31 642 B4 to connect a friction lining to a support when producing a preform. The support can be connected to the finished lining during the course of a hot pressing procedure or by means of a separate gluing process. The object of the invention is to improve the gluing of friction linings to supports by means of an adhesive.

With a method for gluing a friction lining to a support by means of an adhesive that develops its full adhesive effect under the influence of pressure and/or temperature, the object is achieved in that the friction lining and the support are pressed together along with the adhesive before the adhesive develops its full adhesive effect in order to stick the friction lining to the support. When affixing the friction lining to the support, the friction lining is pre-fixed to the support. The friction lining is then only ultimately fixed to the support when the glue develops its full adhesive effect. The glue develops its full adhesive effect in a subsequent crosslinking or curing process under the relatively prolonged influence of a higher temperature compared with during the affixation of the friction lining to the support. To affix the friction lining to the support, the adhesive is only subject over a short period to a high pressure and a lower temperature than when curing or crosslinking. The friction lining is preferably a clutch friction lining of a dry friction clutch, in particular a double clutch. The support is preferably a sheet metal support. The friction lining is preferably coated with adhesive.

A preferred exemplary embodiment of the method is characterized in that the adhesive is made to flow under the influence of pressure and/or temperature, before the adhesive develops its full adhesive effect. The flowing adhesive distributes optimally between the support and friction lining. The flowing adhesive particularly advantageously penetrates, in part, the preferably porous friction lining. During this process, the pressure and/or the temperature is/are set such that the adhesive does not yet crosslink or cure. The adhesive only crosslinks or cures after the affixing process, at a much higher temperature over a longer period of time.

A further preferred exemplary embodiment of the method is characterized in that the support and the friction lining are positioned and/or centered relative to one another before being pressed together. The support and friction lining are preferably positioned and/or centered in a special pressing tool. During the process, the support and friction lining are positioned relative to one another in particular in the circumferential direction.

A further preferred exemplary embodiment of the method is characterized in that a plurality of friction linings stuck to supports are pressed together in a stacked-gluing process, wherein the adhesive develops its full adhesive effect. In the case of stacked gluing, the friction linings already stuck to the supports are pressed together at a high temperature over a longer period of time than during the previous affixing process, such that the adhesive crosslinks or cures. The pressure during crosslinking or curing is lower than when affixing the friction linings.

With a tool for sticking a friction lining to a support by means of an adhesive, in particular by a method described above, the problem stated in the introduction is achieved in that the tool has a lower tool plate and an upper tool plate, between which the friction lining and the support are pressed together along with the adhesive. The terms "lower" and "upper" relate to the direction of action of the force of gravity. The friction lining is preferably coated with the adhesive. However, it is also possible to coat the support, or the support and the friction lining, with the adhesive. The two tool plates are preferably installed in a C-frame press, with which the required pressure for affixing the friction lining to the support can be applied. A heating plate is installed in the tool plate, which contacts the support, in order to introduce into the tool the heat required to affix the friction lining to the support.

A preferred exemplary embodiment of the tool is characterized in that the lower tool plate has centering pins for the friction lining and centering pins for the support. The centering pins are used to position and/or center the friction lining and the support relative to the tool and relative to one another.

A further preferred exemplary embodiment of the tool is characterized in that the centering pins taper conically at their free end. The centering and positioning of the friction lining and the support is thus facilitated, such that the process can be automated.

A further preferred exemplary embodiment of the tool is characterized in that the centering pins are guided movably in the lower tool plate in their longitudinal direction and are biased by a spring in the direction of the upper tool plate. The positioning and centering of the support and friction lining is thus further facilitated. The tool according to the invention is preferably combined with further tools in a round plate facility.

A further preferred exemplary embodiment of the tool is characterized in that the centering pins for the support have an outer diameter that is different from that of the centering pins for the friction lining. Corresponding through-holes for the centering pins are provided in the support and in the friction lining. The friction lining is preferably positioned and centered first on the lower tool plate. During this process, a through-hole in the friction lining for the centering pin of the support is left open.

With a tool for stacked gluing of supports comprising friction linings that have been affixed to the supports in particular by a method described above, in particular using a tool described above, the above-stated object is achieved in that the tool for stacked gluing has centering rods, which are arranged radially to the outside of the friction linings stuck to the supports in order to position and/or center these friction linings between two press plates. A total of four centering rods are preferably guided into the corner regions of the preferably square press plates. Further positioning pins, which extend through the supports or friction linings, can be omitted. In the case of stacked gluing, the previously affixed friction linings are connected fixedly to the friction linings by applying pressure and high temperature over a relatively long period of time, wherein the adhesive cures or crosslinks.

DESCRIPTION OF THE DRAWINGS

Further advantages, features and details of the invention will emerge from the following description, in which various exemplary embodiments are described in detail with reference to the drawing, in which:

FIG. 6 shows a sectional view of a tool for stacked gluing; and

FIG. 7 shows an enlarged detail VII from FIG. 6.

DETAILED DESCRIPTION OF THE PREFERRED EMBODIMENTS

Figure 1:
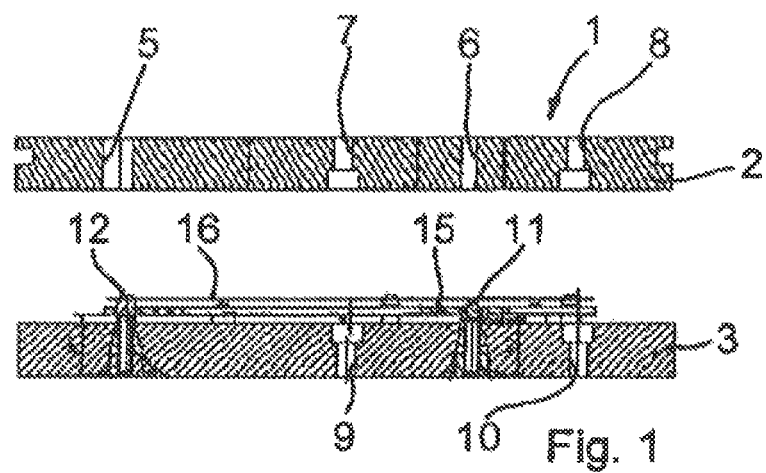
FIG. 1 shows a sectional view of a tool for sticking according to the invention, taken along a line I-I in FIG. 2.

A tool 1 for fastening, including an upper tool plate 2 and a lower tool plate 3 is illustrated in various views and details in FIGS. 1 to 5. In the sectional views of FIGS. 1 and 3, it can be seen that the upper tool plate 2 has a plurality of through-holes 5, 6, 7, 8. The through-holes 5, 6 are used to receive the upper ends of centering pins 11, 12, which are guided movably to and fro in the lower tool plate 3 in the longitudinal direction. The through-holes 7, 8 are used to fasten the upper tool plate 2 to a C-frame press (not illustrated).

The lower tool plate 3 likewise comprises a plurality of through-holes 9, 10. The through-holes 9, 10 are used to fasten the lower tool plate 3 to the C-frame press. The centering pins 11, 12 are guided movably to and fro in further through-holes.

Figure 2:
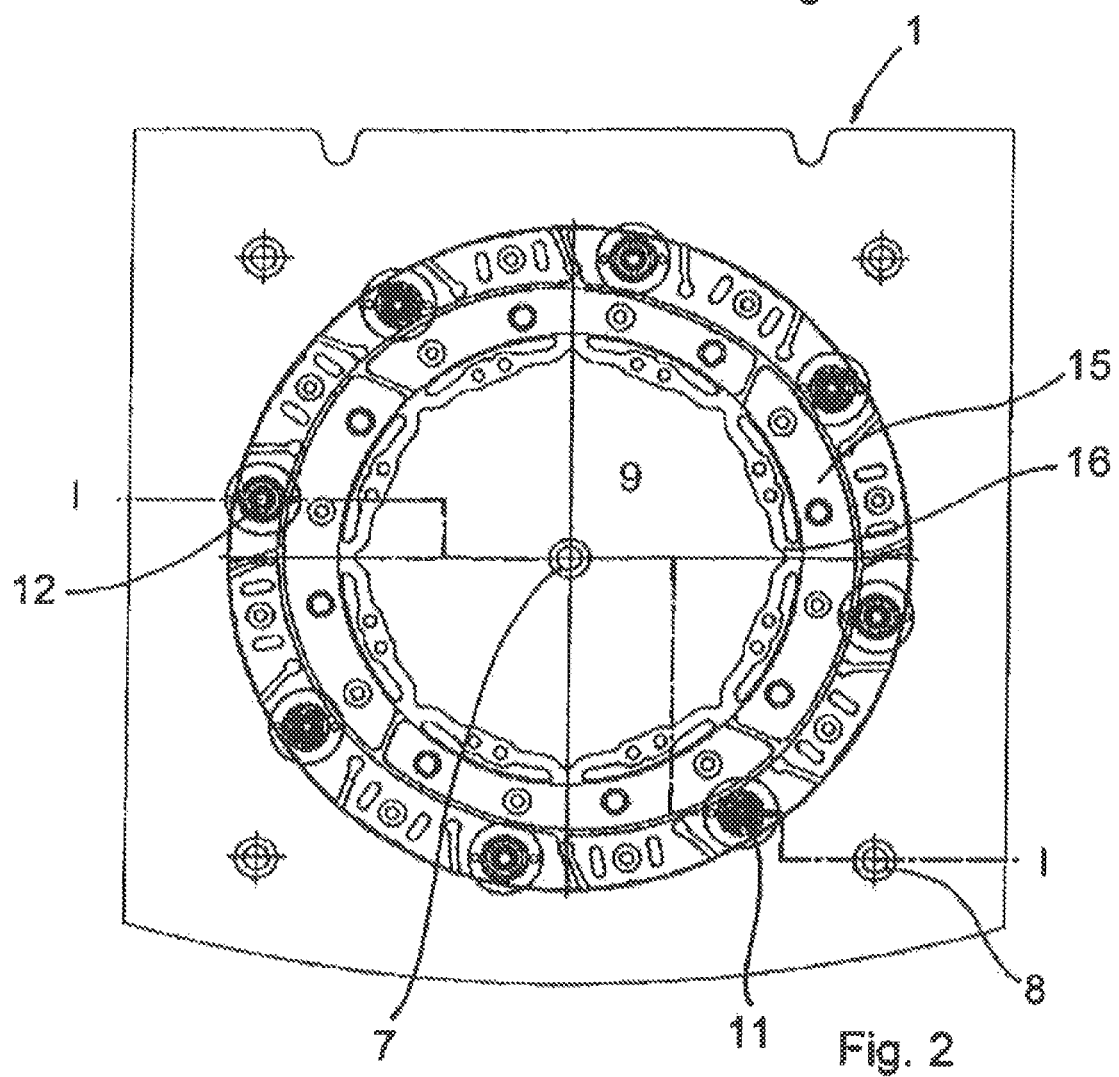
FIG. 2 shows a plan view of the tool from FIG. 1.
Figure 3:
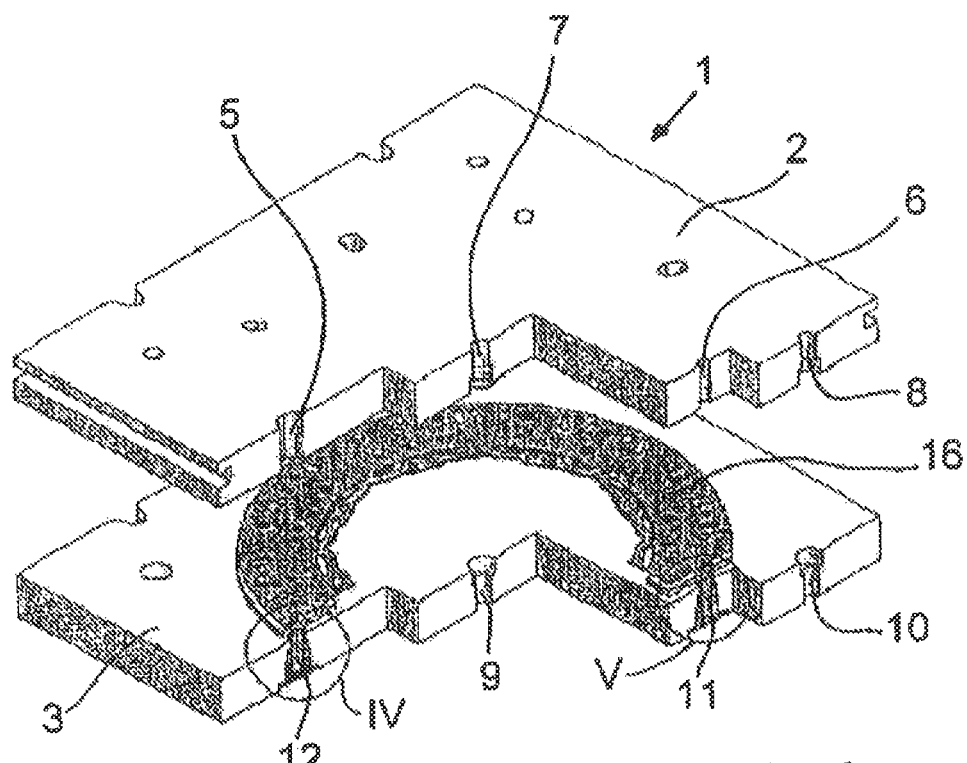
FIG. 3 shows a perspective illustration of the section from FIG. 1.

In the plan view illustrated in FIG. 2, it can be seen that the two tool plates 2, 3 each have a total of five through-holes for fastening the tool plates to the frame press. In addition, it can be seen that the tool 1 comprises a total of eight centering pins 11, 12. The centering pins 11 are arranged alternately with the centering pins 12 in the circumferential direction. Each centering pin 11 is thus arranged between two centering pins 12 in the circumferential direction. Similarly, each centering pin 12 is arranged between two centering pins 11 in the circumferential direction. The centering pins 11 are assigned to a friction lining 15. The centering pins 12 are assigned to a support 16, which is designed as a sheet metal support. The friction lining 15 is coated with an adhesive, which is used to fasten the friction lining 15 to the support 16.

Figure 4:
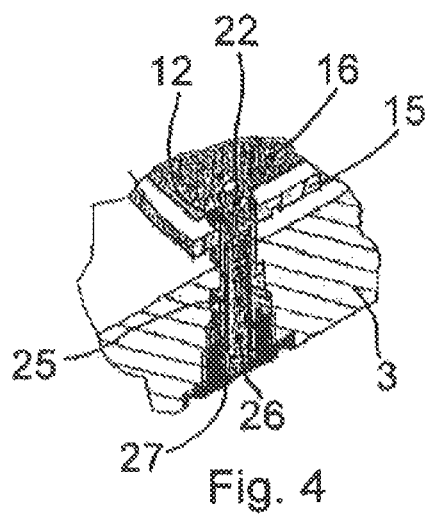
FIG. 4 shows an enlarged detail IV from FIG. 3.
Figure 5:
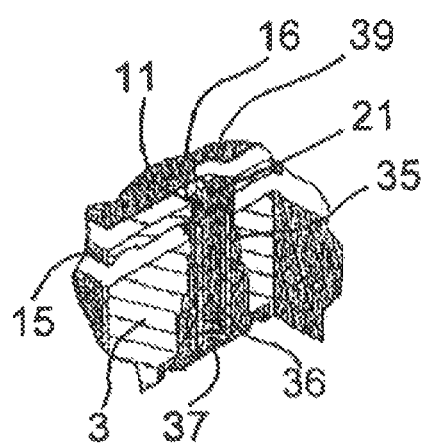
FIG. 5 shows an enlarged detail V from FIG. 3.

In FIGS. 4 and 5, it can be seen that the centering pins 11, 12 each have a conical tapering 21, 22 at their respective ends protruding from the tool plate 3. At their ends arranged in the tool plate 3, the centering pins 11, 12 each have a collar 35; 25, which constitutes an axial stop for the movement of the centering pins 11, 12 upwardly from the tool plate 3.

The centering pins 11, 12 are each biased upwardly from the tool plate 3 by a spring 36; 26, that is to say toward the upper tool plate 2. The spring 36; 26 is arranged in each case with its upper end in the hollow centering pin 11, 12. With its lower end, the spring 36; 26 is supported on a spring cap 37; 27, which is fastened to the underside of the lower tool plate 3.

In FIG. 4, it can be seen that the centering pin 12 extends both through the friction lining 15 and through the support 16 arranged thereabove. The conical tapering 22 at the free end of the centering pin 12 protrudes in part beyond the support 16 and into the through-hole 5 in the upper tool plate 2 arranged thereabove.

In FIG. 5, it can be seen that the centering pin 11 for the friction lining 15 protrudes upwardly beyond the friction lining 15. The support 16 has a through-hole 39 in the region of the centering pin 11. The centering pin 11 can extend through the through-hole 39 and into the through-hole 6 in the upper tool plate 3 arranged thereabove.

The tool 1 for sticking illustrated in FIGS. 1 to 5 is also referred to as an affixing tool. The two tool plates 2, 3 are fabricated for example from tool steel and are installed on the C-frame press via special guides. The friction lining 15 is centered and positioned on the lower tool plate 3 by the four centering pins 11. The support 16 is then positioned and centered relative to the friction lining 15 via the four centering pins 12.

The press is then closed and pre-fixes the support 16 on the friction lining 15. The pre-fixing process is also referred to as sticking or affixing. During the pre-fixing process, the support 16 is stuck to the friction lining 15. The friction lining 15 is, of course, also stuck to the support 16 during this process. In a variant of the tool 1, the friction lining 15 may be inserted first, followed by the support 16.

A heat-activatable, possibly solvent-containing, adhesive on the basis of nitrile rubber/phenol resin is preferably used as an adhesive. For the affixing process, a pressure of approximately 50 tons with an affixing time of approximately 10 seconds is preferably applied by the frame press. The affixing temperature is between 150 degrees Celsius and 205 degrees Celsius. At this affixing pressure and at this affixing temperature, the adhesive starts to flow, but does not yet cure.

In each case, a friction lining 15 is stuck to a support 16, or vice versa, in the tool 1. After the affixing process, the stuck friction lining/support composite is removed from the opened tool 1. The friction lining/support composite parts stuck together are then subjected to stacked gluing in a tool 41.

A tool 41 for stacked gluing is illustrated in FIGS. 6 and 7 in various views. The stacked-gluing tool 41 comprises two press plates 42 and 43. The press plate 42 may be arranged above the press plate 43 based on the direction of action of the force of gravity. A total of three stacks 45, 46, 47 comprising friction lining/support composite parts glued together are arranged between the two press plates 42 and 43. Each stack comprises twelve stuck composite parts, which each comprise a friction lining 15, which is affixed to the respective support 16. An intermediate plate 51, 52 is arranged between the stacks 45, 46 and between the stacks 46, 47.

In the outer circumferential edge region of the tool 41, four centering rods 54, 55 extend through the intermediate plates 51, 52 and to the outside of the stacks 45 to 47. In accordance with a preferred exemplary embodiment, the four centering rods 54, 55 are arranged radially to the outside of the stacks 45 to 47 in the corner regions of the press plates 42, 43, such that the friction linings 15 glued to the supports 16 are centered radially to the inside of the centering rods 54, 55.

A central threaded rod 60 extends through the press plates 42, 43, the stacks 45 to 47 and the intermediate plates 51, 52. A first nut 61 is fastened at one end of the threaded rod 60. A second nut 62 is screwed onto the other end of the threaded rod 60. A bearing 64, which is designed as an axial deep groove ball bearing, and a disk spring assembly 65 are arranged between the nut 62 and the press plate 42.

A defined torque is introduced via the nut 62 and the central threaded rod 60 in order to tension the two press plates 42 and 43 against one another. In the case of stacked gluing, a sufficient pressure is applied to the tool 41. During the process, the tool 41 is exposed to a temperature of approximately 205 degrees Celsius, for example in a furnace, for approximately six hours. In the case of stacked gluing, a much lower pressure of approximately three tons may possibly be sufficient with the component parts already stuck in order to cure or crosslink the adhesive.

With stacked gluing, the adhesive crosslinks fully. Before the stacks 45 to 47 are removed, they are cooled to room temperature. The pressure during stacked gluing is preferably maintained from the moment at which the press plates 42, 43 are clamped, during the stacked gluing process in the furnace, until removal. Due to the combination according to the invention of the affixing process in the tool 1 illustrated in FIGS. 1 to 5 with the stacked gluing in the tool 41 illustrated in FIGS. 6 and 7, extremely high requirements in terms of burst speed, in particular after thermal damage, can be met.

LIST OF REFERENCE SIGNS

1 tool
2 upper tool plate
3 lower tool plate
5 through-hole
6 through-hole
7 through-hole
8 through-hole
9 through-hole
10 through-hole
11 centering pin
12 centering pin
15 friction lining
16 support
21 conical tapering
22 conical tapering
25 collar
26 spring
27 spring cap
35 collar
36 spring
37 spring cap
39 through-hole
41 tool
42 upper press plate
43 lower press plate
45 stack
46 stack
47 stack
51 intermediate plate
52 intermediate plate
54 centering rod
55 centering rod
60 threaded rod
61 nut
62 nut
64 bearing
65 disk spring assembly

The invention claimed is:

1. A method for gluing a friction lining to a support, comprising:
    applying an adhesive to at least one of the friction lining and the support, a full adhesive effect of the adhesive being developed under the influence of at least one of pressure and temperature; and
    pressing the friction lining and the support together with the adhesive before the adhesive develops the full adhesive effect so that the friction lining is affixed to the support before the adhesive develops the full adhesive effect and forms a composite part including the friction lining and the support, wherein the friction lining is porous and the step of pressing causes the adhesive to flow such that the adhesive is distributed between the support and the friction lining and penetrates at least partially the porous friction lining,
    wherein a plurality of composite parts, each including a friction lining glued to a respective support, are arranged in a stack without intervening elements and pressed together in the stack so that the adhesive develops the full adhesive effect when the stack of composite parts are pressed together,
    wherein the step of pressing uses a tool having a first press plate, a second press plate, and at least one intermediate plate, and the step of pressing comprises the substeps of:
    placing a first stack comprising a first plurality of composite parts without intervening elements between the first press plate and the at least one intermediate plate; placing a second stack comprising a second plurality of composite parts without intervening elements between the second press plate and the at least one intermediate plate; and simultaneously pressing the first stack and the second stack between the first and second press plates, and
    wherein the tool includes a central threaded rod extending through the first press plate, the first stack, the at least one intermediate plate, the second stack, and the second press plate, and wherein the step of simultaneously pressing comprises tightening only a nut on the central threaded rod with a disk spring assembly and a bearing arranged between the nut and the second press plate.

2. The method of claim 1, further comprising the step of positioning or centering the friction lining and the support relative to each other before the step of pressing.

3. The method of claim 1, wherein the first and second stacks are pressed together by a force of approximately three tons and the tool is exposed to a temperature of approximately 205 degrees Celsius to cure or crosslink the adhesive.

4. The method of claim 1, wherein the bearing is an axial deep groove ball bearing.

* * * * *